United States Patent [19]

Webber

[11] 4,445,212

[45] Apr. 24, 1984

[54] ARRANGEMENT FOR MULTIPLE CUSTOM CALLING

[75] Inventor: Robert C. Webber, Glendale, Ariz.

[73] Assignee: GTE Automatic Electric Labs Inc., Northlake, Ill.

[21] Appl. No.: 316,255

[22] Filed: Oct. 29, 1981

[51] Int. Cl.³ .............................................. H04Q 11/04
[52] U.S. Cl. .................................... 370/62; 179/18 B; 179/18 BC
[58] Field of Search .................. 370/62, 63; 179/18 B, 179/18 BC, 18 BG

[56] References Cited

U.S. PATENT DOCUMENTS

| 3,504,123 | 3/1970 | Fischer et al. | 370/62 |
| 3,517,135 | 6/1970 | Fisch et al. | 370/62 |
| 3,967,070 | 6/1976 | Srivastava et al. | 370/62 |
| 3,997,731 | 12/1976 | Wilmot et al. | 179/18 B |

FOREIGN PATENT DOCUMENTS

| 52-20712 | 2/1977 | Japan | 179/18 BG |
| 56-56063 | 5/1981 | Japan | 179/18 BG |

OTHER PUBLICATIONS

"ITT 1240 Digital Exchange" by J. M. Cotton, Electrical Communication, vol. 54, No. 3, 1979, pp. 215-224.

Primary Examiner—Douglas W. Olms
Attorney, Agent, or Firm—Frank J. Bogacz; Robert J. Black

[57] ABSTRACT

The arrangement described herein provides for simple control and minimal program impact of a central office switching system for interfacing multiple custom calls. This arrangement employs a few simple trunks connected in a loop around configuration. The arrangement shown considers the connection of a three way calling subscriber, who is a non-control party in a second custom caller's three way call, to another telephone subscriber.

5 Claims, 4 Drawing Figures

ARRANGEMENT FOR MULTIPLE CUSTOM CALLING

CROSS-REFERENCE TO RELATED APPLICATIONS

The present application is related to copending U.S. patent applications Ser. Nos. 316,252; 316,254; 316,268; and 316,377, having the same inventive entity and being assigned to the same assignee.

BACKGROUND OF THE INVENTION (1) Field of the Invention

The present invention pertains to multiple custom telephone calling features and more particularly to an arrangement for controlling these custom calling features which interface with one another in a common central office.

(2) Description of the Prior Art

As computerization was introduced into telephone switching offices, it was understood that more complex functions could be provided by the switching office. Among these functions ae such features as special ticketing and billing arrangements and custom calling features such as three way calling, call forwarding, speed calling, and call waiting. To implement each of these special custom calling features complex hardware in the form of trunk circuits and complex programs in the central processing unit of the switching office are required.

When these custom calling features interface with one another further complexity is added to both the trunking arrangement and the program. Among these features the more complex are call waiting and three way calling. These features are the most complex since they require the greatest amount of hardware and program to handle their operation. Call waiting service is defined as: A call waiting subscriber will hear a short tone, if he is already using his line and the second party is attempting to reach him. The second party receives normal ring back tone and the line is split, so that only the subscriber to be called will hear the short tone. The tone will be repeated in 10 seconds as a reminder, and if unanswered, the second party will receive ring back tone. If the subscriber wants to end his first call he simply hangs up and his phone will ring with the second party on the line. If he wants to hold the first party while answering the second, he presses the hookswitch for one-half a second. With this method he can switch between parties at will.

Three way calling service is defined as: A three way calling subscriber can add a third party to an existing conversation. While the subscriber is conversing with another party, a third party can be added to the conversation by depressing his hookswitch for one-half a second. This puts the original party on hold, and the subscriber will hear a special dial tone (3 spurts of tone followed by regular dial tone). He can then dial the third party and hold a private conversation with the third party. To establish the three way connection the subscriber must again depress its hookswitch for one-half a second. If the third party did not answer or if the subscriber wants to drop a third party from the three way call, he simply depresses his hookswitch for one-half a second and the original parties are re-established (and the subscriber may again establish a three way call). To disconnect, the subscriber simply hangs up and all connections will be broken down.

These custom calling features require specialized trunk arrangements and complex program for the manipulation of the connection of parties in response to hookswitch flashing. Arrangements for connecting custom calling subscribers individually are shown in an article entitled "Custom Calling Services on No. 1 EAX" by J. D. McLean in the GTE Automatic Electric Technical Journal, July, 1976, Vol. 15—No. 3. This article shows basic configurations for the establishment of call waiting and three way calling custom features as independent calls. This article shows the special trunks and junctors which were developed for the implementation of these custom calling features. However, the article does not deal with the interconnection of these custom calling features to one another and the resulting complexity added by this arrangement.

One manner in which to handle the problem of interacting custom calls is to prevent subscribers from calling other subscribers who have active custom calling features. This is not a suitable solution since certain subscribers would be unable to reach whomever they chose to call. Another solution is to provide complex trunks or to increase the logic on the controlling program to accommodate all the interactions of two interacting custom calls. However this situation resulted in expensive trunk arrangements which are undesirable since they increase the cost of the custom calling feature to the subscriber.

The above mentioned problems are further compounded when both of the interacting custom calls are made from the same switching office. This situation means that one switching office must control the operation of multiple custom calls making the interacting decisions very complex.

Accordingly it is the object of the present invention to provide a simple trunking arrangement and program for the operation of multiple interacting custom calls within a particular telephone switching office for a three way calling subscriber who is not the controlling party in another three way call.

SUMMARY OF THE INVENTION

The present invention comprises an arrangement for multiple custom calling telephone calls within a switching office. Two custom calling subscribers (each a three way calling subscribers) are connected together with a POTS (plain old telephone service) subscriber via a switching network of a central office in an existing three way call. The first custom calling subscriber has initiated the three way call and is termed the controlling party. The second custom calling subscriber and the POTS subscriber are called non-control parties in the three wall call.

When the second custom calling subscriber activates his three way calling feature by flashing his hookswitch, a multiple custom calling situation is detected by the stored program of the CPU. In activating this custom calling feature, the second custom calling subscriber is attempting to place a three way call between the existing three way call and a second POTS subscriber, although the second POTS subscriber may himself be a custom calling subscriber.

Each of the subscribers in the existing three way call is connected via a line circuit to the switching network of the central office. There is a corresponding path through the switching network for each subscriber to a three way calling trunk. The three way calling trunk provides for a connection of three subscribers while monitoring the hookswitch flashes of the controlling subscriber.

When the program detects the non-control party custom caller signaling for a request for a three way call, the program first determines that the requesting subscriber is a custom caller. The second custom calling subscriber must be temporarily disconnected from the first three way call trunk, however the requesting custom caller's path must be held so that his connection is not totally dropped from the switching office.

Next, a second three way call trunk must be connected to the second custom calling subscriber via the switching network. Then, a talking path is established from the first three way calling trunk through the switching network to a loop around trunk and another talking path is established from the loop around trunk through the switching network to the second three way calling trunk. Lastly, a talking connection is established from the called second POTS subscriber through the switching network to the second three way calling trunk.

As a result, the first three way call is established between the controlling first custom calling subscriber the first POTS subscriber and the second custom calling subscriber via the loop around trunk. The second three way call is established between the controlling second custom caller, the second POTS subscriber and the first three way call.

The program logic treats each three way call as a connection between a controlling custom calling subscriber, a second POTS subscriber and a connection to an outgoing trunk (i.e. the loop around trunk). The outgoing trunk connection appears to the program logic as a subscriber located in a remote switching center and therefore, simplifies the handling of each of the custom calls. Therefore, each custom call can be handled by the trunk circuits and program logic without the complexity of combinations of hookswitch flashing by each of the controlling subscribers.

DESCRIPTION OF THE PREFERRED EMBODIMENT

Figure 1:
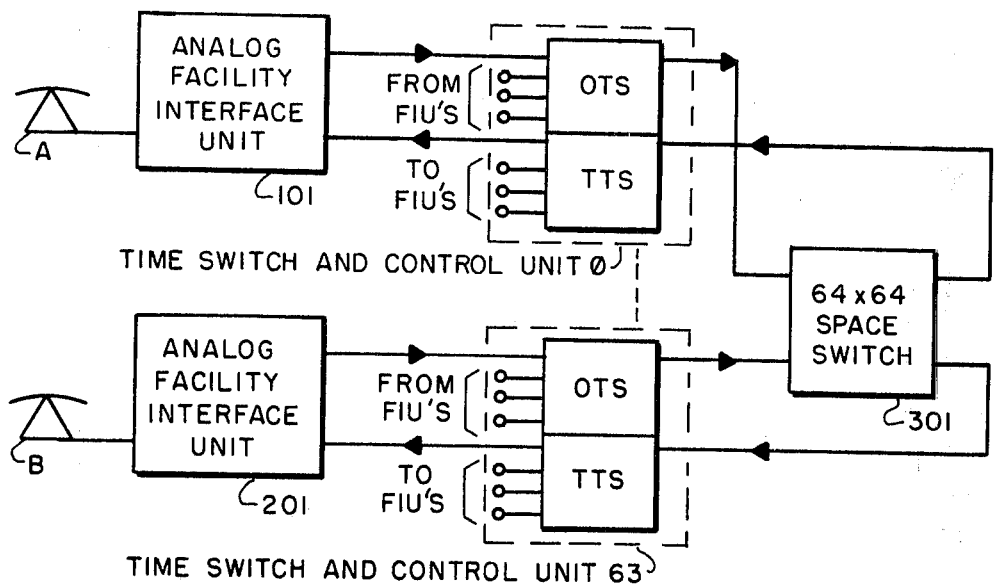
FIG. 1 is a block diagram depicting the overall network structure of associated with the present invention.

FIG. 1 is a block diagram showing a T-S-T network of a digital switching center for switching a local to local telephone call between POTS subscribers. Subscriber A is connected via an analog facility interface unit (FIU) 101. The analog FIU 101 has a PCM voice connection to time switch and control unit (TCU) 0. Each TCU has 2 time stages associated with it, an orginating time stage (OTS) and a terminating time stage (TTS).

A connection is made from the OTS of a particular TCU to the 64 by 64 space switch 301. Then, a connection is established between the space switch 301 and the terminating time stage of TCU 63, for example. Subscriber B is connected through analog FIU 201 to the TTS of TCU 63.

Next a voice transmission link is established from subscriber B to subscriber A. This communication link is established via FIU 201, the OTS of TCU 63, through space switch 301, through the TTS of TCU 0, through analog FIU 101 to subscriber A. As a result, a full talking path has been established between subscribers A and B.

Figure 2:
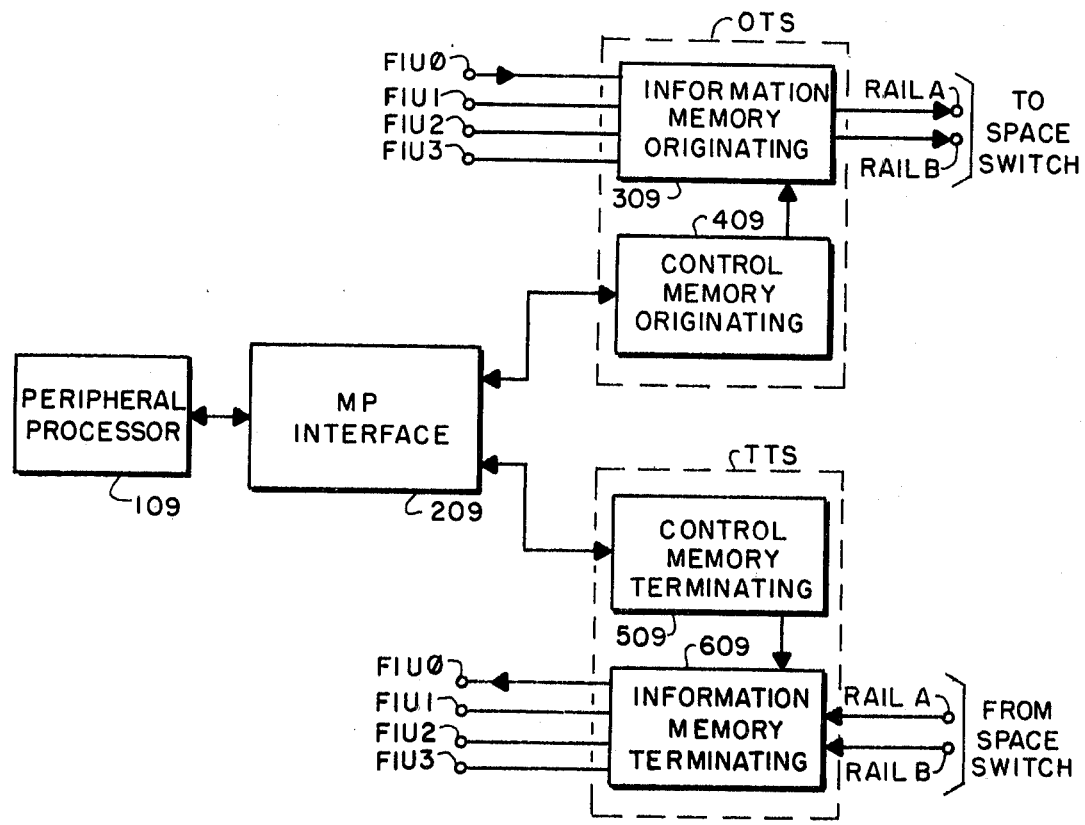
FIG. 2 is a block diagram depicting the originating and terminating time stages of the present invention and their connection to the central processing unit.

FIG. 2 shows the connection of a particular TCU to a corresponding microprocessor CPU 109. Each stage of a time and control unit includes an information memory and a control memory. For example, the originating time stage OTS shown includes an information memory 309 and a control memory 409. Microprocessor interface 209 connects the CPU 109 to the control memories 409 and 509.

The information memories 309 and 609 each contain information memory units with PCM samples. Up to four FIU's may be connected to each TCU. These FIU's may be analog line FIU's, connecting telephone subscribers to the network, as shown in FIG. 1 or analog trunk FIU's for connecting calls to service or outgoing trunk circuits.

Figure 3B:
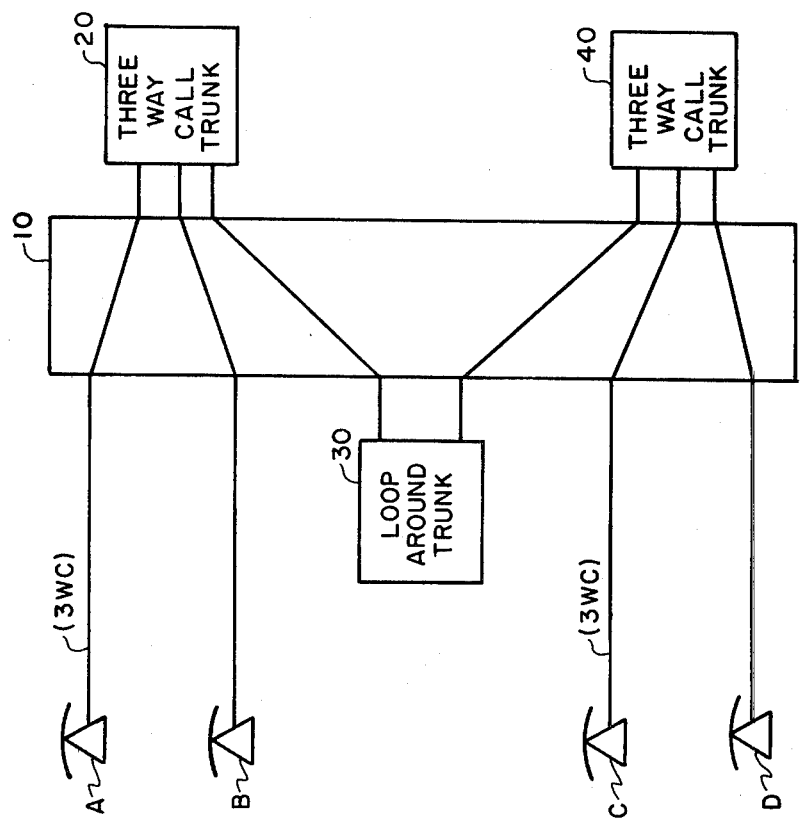
FIG. 3B is a block diagram depicting the multiple custom calling network arrangement of two independent three way calls in accordance with the present invention.
Figure 3A:
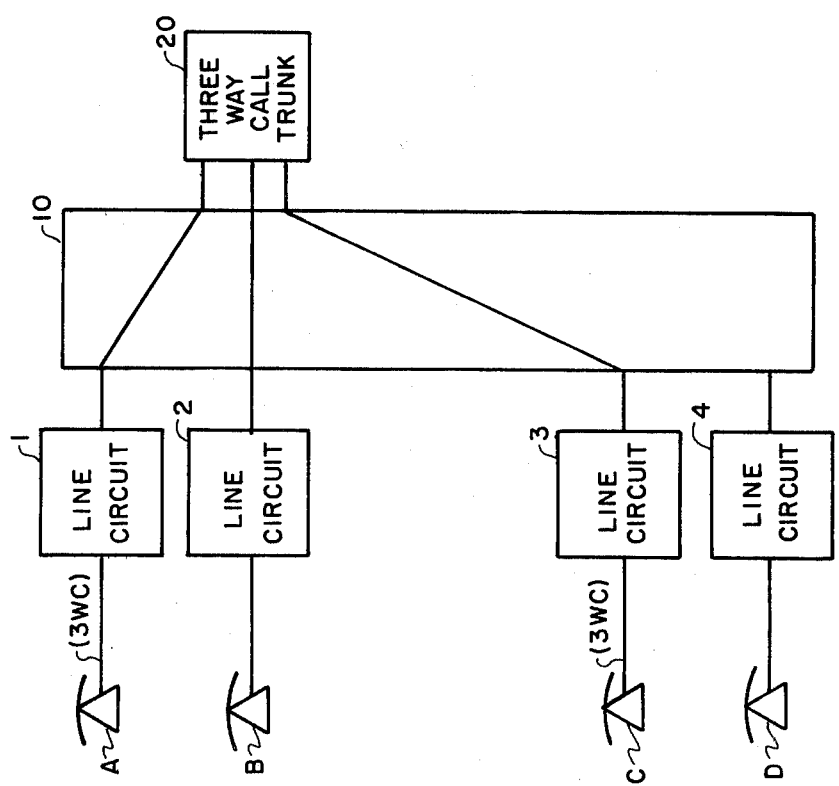
FIG. 3A is a block diagram depicting an existing three way call between two three way callers and another telephone subscriber.

Referring now to FIG. 3A, network 10 includes such elements as analog FIU's, time switch and control units, which further include information and control memories, and a space switching stage. Subscriber A, who is a three way calling subscriber (3WC), is shown connected through network 10 to three way call trunk 20.

Subscriber A is the controlling party in the three way call between himself and subscribers B and C. Subscriber C is also a three way calling subscriber (3WC), but is not the control party in the existing three way call. Each of the subscribers A through D is connected to switching network 10 by line circuits 1 through 4 respectively.

When subscriber C flashes his hookswitch indicating he wishes to place a three way call, a sensor in line circuit 3 detects this condition and signals the program to connect a digit receiver to subscriber C for collecting the new called party's digit. Subscriber C is attempting to dial subscriber D. To accomplish this, subscriber C is momentarily disconnected from the existing three way call. Also under direction of the program, subscriber C's line is provided with hold to avoid dropping the connection.

Referring to FIG. 3B, the program connects subscriber C through switching network 10 to a second three way calling trunk 40. Next, the program selects a loop around trunk having input and output connections to the same switching network. Then, the program selects a path from three way call trunk 20 through switching network 10 to loop around trunk 30 and a second path from loop around trunk 30 through switching network 10 to three way calling trunk 40. Lastly, subscriber D is connected through switching network 10 to three way calling trunk 40.

As a result of these connections, two independent three way calls exist, first one between subscriber A, subscriber B three way calling trunk 40 via loop around trunk 30; and, the second three way call between subscriber C, subscriber D and three way calling trunk 20 via loop around trunk 30. Hookswitch flashes of subscriber A are interpreted by the program via a sensor associated with each subscribers line circuit and not forwarded through loop around trunk 30 and similarly hookswitch flashes of subscriber C are interpreted by sensors with its respective line circuit and not forwarded through loop around trunk 30. Therefore, the hookswitch flashes of these subscribers do not interact and require complex logic to determine the type of request being made. The two, three way calls are logically separated and handled as though the connection through loop around trunk was a connection to another switching office. As a result, the control trunk logic is minimized. In addition, the program logic required for outgoing custom calls and intra-office custom calls may be similar in operation, resulting in great savings of program logic. The logic saved via this loop around configuration is equivalent to approximately 1,000 man hours of design development time period.

It is to be noted that the complex situation of subscriber disconnects during multiple custom calls is handled as though only a single custom call was involved. This is a further result of the separation via the loop around trunk 30 of the two custom calls.

Although a preferred embodiment of the invention has been illustrated and that form described in detail, it will be readily apparent to those skilled in the art that various modifications may be made therein; without departing from the spirit of the invention or from the scope of the appended claims.

What is claimed is:

1. In a telephone switching office, an arrangement for multiple custom calling comprising:
   a CPU;
   a switching network connected to said CPU;
   a plurality of telephone subscribers connected to said switching network including at least a first and a second custom calling subscriber and a third and a fourth telephone subscriber:
   first network means for connecting said first and second custom calling subscribers with said third telephone subscriber in a first active three way call initiated by said first custom calling subscriber, said first network means being connected to said switching network and to said CPU;
   means for detecting a request for a second three way call from said second custom calling subscriber to a fourth telephone subscriber, said means for detecting connected to said switching network and being operated to transmit said request to said CPU;
   means for holding said second custom calling subscriber while maintaining said first active three way call between first custom calling subscriber and said third telephone subscriber, said means for holding being connected to said switching network and operated in response to said request to said CPU for said second three way call;
   means for temporarily disconnecting said second custom calling subscriber from said first active three way call, said means for temporarily disconnecting being connected to said switching network and operated in response to said request to said CPU for said second three way call;
   second network means for connecting said second custom calling subscriber to said fourth telephone subscriber and for connecting another subscriber to said second custom calling subscriber and to said fourth telephone subscriber in a second active three way call, said second network means being connected to said switching network and to said CPU; and
   means for connecting telephone subscribers within the same switching office, said means for connecting being connected between said first and said second network means via said switching network, said means for connecting operated by said CPU in response to said means for temporarily disconnecting to provide for connecting said first network means with said second and fourth subscribers in said second active three way call, while rendering said first and second active three way telephone calls independently controlled.

2. An arrangement for multiple custom calling as claimed in claim 1, wherein said means for connecting includes a loop around trunk having output connections for connecting to said switching network and input connections for connection to said same switching network.

3. An arrangement for multiple custom calling as claimed in claim 1, wherein said switching network comprises a digital switching network.

4. An arrangement for multiple custom calling as claimed in claim 3, wherein said digital switching network further comprises a time-space-time digital switching network.

5. An arrangement for multiple custom calling as claimed in claim 1, wherein said connection of each of said plurality of telephone subscribers includes a line circuit.

* * * * *